(12) United States Patent
Nishiwaki et al.

(10) Patent No.: US 7,863,351 B2
(45) Date of Patent: Jan. 4, 2011

(54) PIGMENT INK FOR INK JET RECORDING

(75) Inventors: Yuko Nishiwaki, Mitaka (JP); Kenji Nishiguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 469 days.

(21) Appl. No.: 11/949,921

(22) Filed: Dec. 4, 2007

(65) Prior Publication Data

US 2008/0139740 A1 Jun. 12, 2008

(30) Foreign Application Priority Data

Dec. 7, 2006 (JP) .............................. 2006-331152

(51) Int. Cl.
*C09D 11/00* (2006.01)

(52) U.S. Cl. ........................ 523/160; 524/556; 347/100; 106/31.6

(58) Field of Classification Search ................ 523/160; 524/556; 347/100; 106/31.6
See application file for complete search history.

(56) References Cited

U.S. PATENT DOCUMENTS

| | | | |
|---|---|---|---|
| 6,117,921 A | 9/2000 | Ma et al. | 523/161 |
| 6,713,531 B2 | 3/2004 | Iijima | 523/160 |
| 2004/0212667 A1 | 10/2004 | Nishiguchi | 347/96 |
| 2005/0075418 A1 | 4/2005 | Nishiguchi | 523/160 |
| 2007/0287769 A1 | 12/2007 | Nishiwaki et al. | 523/160 |
| 2007/0287770 A1 | 12/2007 | Nishiguchi et al. | 523/160 |

FOREIGN PATENT DOCUMENTS

| | | |
|---|---|---|
| JP | 5-263029 | 10/1993 |
| JP | 10-87768 | 4/1998 |
| JP | 2001-106951 | 4/2001 |
| JP | 2004-114535 | 4/2004 |

*Primary Examiner*—David Wu
*Assistant Examiner*—Vu A Nguyen
(74) *Attorney, Agent, or Firm*—Fitzpatrick, Cella, Harper & Scinto

(57) ABSTRACT

A pigment ink for ink jet recording containing a pigment, water, a graft copolymer and a water-soluble organic solvent, in which a hydrophobic segment constituting the graft copolymer is obtained by copolymerizing a monomer represented by the following formula (1), having an aromatic ring or the like and a monomer having an anionic functional group, and a hydrophilic segment constituting the graft copolymer is obtained by polymerizing a monomer having an anionic functional group:

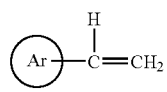

(1)

wherein Ar represents an aromatic ring selected from a benzene ring, a condensed benzene ring and a heteroaromatic ring, or a derivative thereof.

8 Claims, No Drawings

PIGMENT INK FOR INK JET RECORDING

BACKGROUND OF THE INVENTION

1. Field of the Invention

The present invention relates to a pigment ink for ink jet recording, excellent in dispersion stability and storage stability, and exhibiting a high ejection stability, even in an ink jet recording process in which the ink is ejected by the application of thermal energy as ejection energy. It further relates to a pigment ink capable of obtaining an image having a sufficient scratch resistance, in case of printing on a glossy paper as the ink jet recording medium.

2. Description of the Related Art

An ink for ink jet recording, employed in the ink jet recording process, is for example a dye-based ink constituted of water as a principal component and a colorant which is a dye soluble in the water. The dye-based ink has advantages of being excellent in the prolonged storage, not easily causing a nozzle clogging at the ejection, and providing a print excellent in color saturation and transparency. On the other hand, it is associated with drawbacks of being deficient in the weather resistance and the water resistance of the obtained print.

Therefore, attention is recently paid to a pigment ink utilizing a pigment as the colorant for the purpose of improving the weather resistance of the image in particular. The pigment, which is not soluble in water, has to be dispersed in an ink solvent, in order to be used as an ink. It may however be difficult to maintain the dispersed state of the pigment in the ink in an optimum state over a prolonged period, without causing aggregation or sedimentation. Also in the case of a process utilizing an electrothermal converting element as the means for supplying the aforementioned ejection energy, as a liquid droplet is ejected by a bubble generation occurring on providing the ink with thermal energy, it can be anticipated that the thermal energy at the bubble formation causes a rapid change in the properties of the ink. Therefore, particularly in case of ejecting a pigment ink of a low dispersion stability, stable ejection characteristics may not be achieved for example because of deposits accumulated in the ejection nozzle.

In order to solve such problems, there is proposed to use, as a dispersant, a graft copolymer in which either one of a main chain unit and a side chain unit is a hydrophilic segment and the other is a hydrophobic segment (Japanese Patent Application Laid-Open No. H10-087768). In such structure, the hydrophobic segment constituting the graft copolymer fulfills a function of being physically adsorbed, through a hydrophobic interaction, on the hydrophobic pigment particles, while the hydrophilic segment performs a function of spreading in water as the ink solvent, thereby providing the pigment particle with a repulsive force. In the pigment ink utilizing such graft copolymer in which the hydrophobic segment and the hydrophilic segment are clearly separated, the dispersion stability of the pigment and the long-term storage stability and the ejection stability of the pigment ink are improved by the effective expression of the respective functions.

On the other hand, in the recording medium for ink jet recording, in order to enable a recording of high image quality with a dye-based ink, there has been employed a recording medium provided with an ink receiving layer, having many air gaps on the surface, thereby improving the ink absorbing property. The dye-based ink, in which the dye molecules are dissolved in the ink, can be promptly absorbed in the ink receiving layer to provide a record of a high image quality. However, in the case of printing with a pigment ink on such recording medium, the pigment particles are fixed on the surface of the recording medium since most of the pigment particles dispersed in the ink are larger than the air gaps in the ink receiving layer. As a result, in the case that the mutual cohesion of the pigment particles or the adhesion between the recording medium and the recorded image is not sufficient, the image becomes inferior in the scratch resistance and causes a problem that the record is scraped off even by a slight scratching on the surface.

In order to solve such problem, improvements have been made by adding a water-soluble resin, an emulsion or a latex to the ink (see Japanese Patent Application Laid-Open Nos. H05-263029 and 2001-106951). However, in the case of adding an ordinary water-soluble resin to the ink, there may result a problem of an unstable ink ejection or a clogging due to an increase in the ink viscosity, whereby the ink becomes inferior in the ink jet characteristics. On the other hand, in the case of adding an emulsion or a latex, an ink ejection failure tends to occur because of foaming by the emulsion or an increase in the ink viscosity, or a faulty ink ejection or a defective print tends to occur because of sticking of the emulsion in the nozzle interior or on the nozzle face.

Also proposed is an improvement on the recording medium itself, for example by defining the surface roughness (Japanese Patent Application Laid-Open No. 2004-114535). However, this method necessitates a particular recording medium, and a satisfactory record cannot be obtained by the conventional recording medium for ink jet recording.

SUMMARY OF THE INVENTION

Therefore, an object of the present invention is to provide a pigment ink for ink jet recording which is extremely excellent in dispersion stability, and which can achieve a high ejection stability, even in an ink jet recording process in which the ink is ejected by the application of thermal energy as ejection energy. Another object of the present invention is to provide a pigment ink for ink jet recording which can enable the formation of images realizing a sufficient scratch resistance, even in case of printing on a glossy paper which is commonly used as the ink jet recording medium.

The aforementioned objects can be accomplished by the following inventions. The pigment ink for ink jet recording of the present invention is a pigment ink for ink jet recording comprising a pigment, water, a graft copolymer and a water-soluble organic solvent, wherein the graft copolymer has a hydrophobic segment and a hydrophilic segment, the hydrophobic segment is obtained by copolymerizing a monomer represented by the following formula (1), having an aromatic ring or a derivative thereof and a monomer having an anionic functional group, and the hydrophilic segment is obtained by polymerizing a monomer having an anionic functional group:

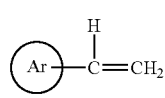

(1)

wherein Ar represents an aromatic ring selected from a benzene ring, a condensed benzene ring and a heteroaromatic ring, or a derivative thereof.

The present invention of the aforementioned construction allows to provide a pigment ink for ink jet recording, extremely excellent in dispersion stability, and exhibiting a high ejection stability, even in an ink jet recording process in which the ink is ejected by the application of thermal energy as ejection energy. Also provided is a pigment ink for ink jet recording, capable of forming an image having a sufficient scratch resistance, even in case of printing on a glossy paper that is commonly used as the ink jet recording medium.

Further features of the present invention will become apparent from the following description of exemplary embodiments.

DESCRIPTION OF THE EMBODIMENTS

In the following, the present invention will be further clarified by exemplary embodiments thereof. The pigment ink for ink jet recording of the present invention at least includes a pigment as a colorant, a graft copolymer having a specified structure, water, and a water-soluble organic solvent. The graft copolymer has a hydrophobic segment and a hydrophilic segment, and is characterized in that these segments have following constructions. First, the hydrophobic segment constituting the graft copolymer can be obtained by copolymerizing a monomer represented by the following formula (1), having an aromatic ring or a derivative thereof and a monomer having an anionic functional group. On the other hand, the hydrophilic segment can be obtained by polymerizing a monomer having an anionic functional group. Therefore, an extremely excellent dispersion stability can be achieved. As a result, there can be realized a stable ink ejection characteristics, even in case of use in a thermal ink jet recording apparatus of a process in which the ink is ejected by the application of thermal energy as ejection energy, and a sufficient scratch resistance of the image on a glossy paper. Hereinafter, the monomer represented by the following formula (1), having an aromatic ring or a derivative thereof will be referred to as a monomer represented by the formula (1), having an aromatic ring or the like:

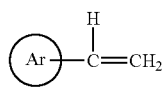

(1)

wherein Ar represents an aromatic ring selected from a benzene ring, a condensed benzene ring and a heteroaromatic ring, or a derivative thereof.

The hydrophobic segment of the graft copolymer in the present invention means a segment in which, among monomers copolymerized for constituting the hydrophobic segment, a monomer having a hydrophobic functional group is in a content of at least 50% by mass or more. Also the hydrophilic segment means a segment in which a monomer having a hydrophilic functional group is in a content of at least 50% by mass or more.

The hydrophobic segment of the graft copolymer having the aforementioned construction performs a function of being physically adsorbed, through a hydrophobic interaction, by the hydrophobic pigment particle surfaces. On the other hand, the hydrophilic segment fulfills a function of spreading in water, constituting the ink solvent, thereby providing the pigment particles with a repulsive force by a steric hindrance repulsive force among the hydrophilic segments with each other. The graft copolymer, in which the hydrophobic segment and the hydrophilic segment are clearly separated, effectively expresses their functions in the aqueous pigment ink for ink jet recording, thus satisfactorily serving as a dispersant for the pigment. Therefore, the graft copolymer of such construction can be considered as most preferable form of polymer, to be contained in the pigment ink.

When the aqueous pigment ink for ink jet recording, containing the graft copolymer of the aforementioned construction, is applied to a general-purpose glossy paper, liquids such as water and water-soluble organic solvent contained in the ink are rapidly absorbed in the air gaps of the ink receiving layer as the upper layer of the glossy paper. As a result, the pigment particles dispersed in the ink rapidly loses the dispersion medium, whereby the hydrophilic segment of the graft copolymer becomes incapable of spreading in the ink solvent and of providing the pigment particle with the repulsive force. Thereby the pigment particles assume an agglomerated state on the glossy paper. In the case of employing the monomer represented by the formula (1), having an aromatic ring or the like as the monomer constituting the hydrophobic segment of the graft copolymer, a strong hydrophobic interaction is generated between the aromatic rings simultaneously with the aggregation of the pigment particles. Therefore, in the case of utilizing the ink of the present invention, containing the graft copolymer of the aforementioned construction, the pigment is considered to assume a stable cohesion state on the glossy paper. It is thus estimated that the pigment particles are caused to firmly cohere on the glossy paper, thereby increasing the scratch resistance of the image.

The monomer having an aromatic ring or the like to be employed in the present invention is, as represented by the formula (1), a monomer of a form in which an aromatic ring is directly bonded to a vinyl group. The aromatic ring directly bonded to the vinyl group is not limited to a benzene ring or a condensed benzene ring, constituted of carbon only, but may also be a heteroaromatic ring. Examples of such monomer having such an aromatic ring include styrene, vinylnaphthalene, vinylanthracene, 2-vinylpyridine, 4-vinylpyridine, N-vinylcarbazole and 1-vinylimidazole. Also in the invention, the derivative of the aromatic ring means the aforementioned aromatic rings which are substituted by at least an alkyl group having 4 or less carbon atoms, such as a methyl group or an ethyl group. In the present invention, such monomers may also be employed advantageously.

Also it is possible to increase the cohesive force between the pigment particles in case of copolymerizing a monomer having an anionic functional group, in the hydrophobic segment in such an extent as not to hinder the adsorption on the pigment surfaces. Therefore, the pigment ink containing the graft copolymer of such construction is considered to provide an effect advantageous for improving the scratch resistance of the formed image.

On the other hand, the hydrophilic segment constituting the graft copolymer to be employed in the present invention is formed by polymerizing at least a monomer having an anionic functional group. The hydrophilic segment of the graft copolymer provides, as described above, the pigment particles with a repulsive force by a steric hindrance repulsion. In the case that the monomer constituting the hydrophilic segment is a monomer having an anionic functional group, the pigment surface is charged negatively by the anionic functional group. As a result, an electrostatic repulsive force is also generated between the pigment particles. Thus, in the case that the monomer constituting the hydrophilic segment of the graft copolymer is a monomer having an anionic functional group, a repulse force by steric hindrance repulsion and a repulsive force by an electrostatic repulsion are simultaneously generated among the pigment particles. As a result, the pigment ink can acquire a high dispersion stability by incorporating the graft copolymer having the hydrophilic segment of the above-mentioned construction into the ink.

As the monomer having an anionic functional group to be used in the hydrophobic segment or the hydrophilic segment constituting the graft copolymer to be employed in the present invention, at least one may be selected from the following monomers and may be used each independently. Examples of the monomer having an anionic functional group include monomers having a carboxyl group, and monomers having a sulfonic acid group or a phosphonic acid group. Examples of the monomer containing a carboxyl group include acrylic acid, methacrylic acid, maleic acid (anhydride), itaconic acid and fumaric acid. Also examples of the monomer containing a sulfonic acid group or phosphonic acid group include vinylsulfonic acid, p-vinylbenzenesulfonic acid, and vinylphosphonic acid.

A most preferable monomer having an anionic function group is acrylic acid, in case of forming both of hydrophobic segment and hydrophilic segment. This is because, in the pigment ink containing a graft copolymer utilizing acrylic acid as the monomer for constituting these segments, the graft copolymer comes to show a higher solubility in water, thus enabling to produce a stable dispersion of pigment.

The graft copolymer may have a structure in which either one of a main chain and a side chain has the hydrophobic segment and the other has a hydrophilic segment. In a particular preferred form, a graft copolymer of a structure, in which the main chain is constituted principally of the hydrophobic segment and the side chain is constituted principally of the hydrophilic segment, is added to the pigment ink. This is because the graft copolymer of such construction, contained in the pigment ink, realizes a situation where the hydrophobic segments are closely adsorbed on the pigment surfaces to increase the polymer adsorption onto the pigment, and the hydrophilic segments spread largely in the ink solvent to provide a strong repulsive force between the pigment particles.

The monomer represented by the formula (1), having an aromatic ring or the like and the monomer having an anionic functional group, constituting the hydrophobic segment, preferably have a compositional ratio, in terms of mass, of from 4:1 to 16:1. The hydrophobic segment constituting the graft copolymer has a principal function of being adsorbed on the hydrophobic pigment particle through the hydrophobic interaction. Therefore, in the case that the monomer having an anionic functional group and constituting the hydrophobic segment is present in a copolymerization ratio higher than the above-mentioned range, the hydrophobic segment is considered to have an excessively high hydrophilicity, thus undesirably reducing the adsorbing power to the pigment. On the other hand, in the case that the monomer having an anionic functional group and constituting the hydrophobic segment is present in a copolymerization ratio lower than the above-mentioned range, it is considered that the aforementioned increase in the cohesive force between the pigment particles does not occur.

As the hydrophobic monomer to be used for forming the hydrophobic segment constituting the graft copolymer, the following monomers may be used in addition to the aforementioned monomers. More specifically, there may be employed other monomer having a hydrophobic functional group, that is capable of copolymerization with the aforementioned monomer represented by the formula (1), having an aromatic ring or the like, or the monomer having an anionic functional group. Specific examples of such other monomer capable of copolymerization include vinyl monomers having an aromatic functional group such as benzyl (meth)acrylate, 4-vinylbenzoic acid, a vinylbenzoic acid ester, and N-vinylcarbazole; (meth)acrylic acid esters such as methyl (meth)acrylate, ethyl (meth)acrylate, butyl (meth)acrylate, and cyclohexyl (meth)acrylate; acrylamide type monomers such as (meth)acerylamide, N-methylol (meth)acrylamide, and N,N-dimethylaminopropyl (meth)acrylamide; N-vinylacetamide, N-vinylformamide and vinyl acetate; a vinyl monomer, and those compounds denatured with ethylene oxide or propylene oxide. Also the monomer for forming the hydrophobic segment may contain a hydrophilic monomer other than the monomer having an anionic functional group to be described later, within an extent not hindering the hydrophobicity of the hydrophobic segment.

As the hydrophilic monomer to be used for forming the hydrophilic segment constituting the graft copolymer, there may be employed other monomer having a hydrophilic functional group, capable of copolymerization with the aforementioned monomer having an anionic functional group. Examples of such employable other monomer capable of copolymerization include monomers having a hydroxyl group such as (meth) acrylic acid hydroxyalkyl ester and a mono(meth)acrylic acid ester of a polyhydric alcohol such as ethylene glycol; and a (meth)acrylic acid ester of ethylene oxide or propylene oxide. Also the monomer for forming the hydrophilic segment constituting the graft copolymer used in the present invention may contain the aforementioned hydrophobic monomer within an extent not hindering the hydrophilicity of the hydrophilic segment.

The graft copolymer to be used in the present invention is preferably formed, in the preparation thereof, in such a manner that the acid value thereof is within a range of from 60 to 200 mgKOH/g. An acid value of the graft copolymer less than 60 mgKOH/g is undesirable, since the solubility of such graft copolymer in the solvent, including water and a water-soluble organic solvent constituting the ink of the present invention, is lowered whereby the pigment is not maintained in a stable dispersion state. Also an acid value of the graft copolymer exceeding 200 mgKOH/g is undesirable, since the ink viscosity becomes higher to hinder the ink ejection or the affinity of pigment dispersion to water becomes excessively high to lower the water resistance of prints formed.

In the graft copolymer to be employed in the present invention, the side chain thereof preferably has a weight-average molecular weight within a range of from 300 to 2,000. Also the entire graft copolymer preferably has a weight-average molecular weight within a range of from 1,000 to 30,000 and more preferably from 3,000 to 15,000.

The graft copolymer of the aforementioned construction, to be employed in the present invention, may be prepared by any known method. Advantageously, it may be prepared by the following method. For example, adopted is a method of separately preparing a main chain unit and a side chain unit by plural monomer materials having reactive function group, then mixing the two and reacting the main chain unit and the side chain unit to combine the two. For example the graft copolymer can be prepared by a method of synthesizing the side chain unit in advance as a macromonomer, and reacting thus synthesized macromonomer with a monomer material constituting the main chain unit.

In the present invention, the graft copolymer having the aforementioned specified construction may be used as a dispersing polymer serving as a dispersant for the pigment in the ink (hereinafter called dispersant polymer). Also it may be added as a water-soluble polymer, which is one of the additives to be added when necessitated and to be described later. In the present invention, it can be advantageously employed as the dispersant polymer, in effectively expressing the function of the graft copolymer in the pigment ink. In such case, the graft copolymer is preferably contained within a range of from 0.1 to 15% by mass with respect to the total mass of the pigment ink. The graft copolymer is not limited to a single type, but may be employed in a combination of plural types if desired, or a different type graft copolymer may be employed according to the pigment to be used.

However the preparation of the ink of the present invention is not limited to the aforementioned case, and a polymer material other than the graft copolymer of the construction defined in the present invention may naturally be used as a dispersant polymer. The polymer material to be used in this case may be any polymer such as a vinyl (co)polymer, a polysaccharide, a polypeptide, a polyamide, a polyester, a polyether, or a polyolefin. In particular, a water-soluble polymer is preferably used as the dispersant polymer. Also such polymer material is preferably contained in the ink of the present invention within an extent not exceeding the content of the graft copolymer. Also such polymer material preferably has a weight-average molecular weight within a range of from 1,000 to 30,000.

In the preparation of the ink of the present invention, a base may be added in order to satisfactorily dissolve the dispersant polymer in the water-soluble organic solvent. The base to be used in this case is advantageously an organic amine, such as ammonia, monoethanolamine, diethanolamine, triethanolamine, aminemethylpropanol, or N,N-dimethylethanolamine. Otherwise it may be a hydroxide of an alkali metal, such as potassium hydroxide or sodium hydroxide.

Also, as described in the foregoing, a water-soluble polymer may be added to the ink of the present invention besides the dispersant polymer. The water-soluble polymer in such case may be, in addition to the graft copolymer defined in the present invention, one of the following water-soluble polymers, such as a (meth)acrylic polymer, a polyamide polymer, a polyester polymer, a polypeptide, cellulose and a denatured substance thereof, polyvinyl alcohol, and polyolefin. Such water-soluble polymer is preferably added to the pigment ink in a proportion about equal to or less than that of the aforementioned dispersant polymer. Also in order to improve the solubility of the water-soluble polymer, the base as described above may be added as in the case of the dispersant polymer.

The pigment to be employed in the pigment ink for ink jet recording of the present invention may be an inorganic pigment or an organic pigment. The pigment is advantageously employed, in a mass proportion to the entire mass of the ink, within a range of from 1 to 20% by mass, preferably from 2 to 12% by mass.

In the following, the pigment to be contained in the ink of the present invention will be described. Specifically, an example of a black pigment is carbon black. The carbon black may be one produced by a furnace process, or a channel process. In particular, one having characteristics of a DBP oil absorption amount of from 40 to 200 ml/100 g, a primary particle diameter of from 11 to 40 mμm (nm), a BET specific surface area of from 50 to 400 $m^2$/g, and a volatile content of from 0.5 to 10%, is advantageously employed. Commercial products having such characteristics include those shown below, each of which may be advantageously employed in the present invention. Examples include No. 2300, No. 900, No. 950, MCf88, No. 33, No. 40, No. 45, No. 52, MA7, MA8, No. 2200B (foregoing manufactured by Mitsubishi Chemical Co.), RAVEN 1255 (manufactured by Columbia Carbon Ltd.), REGAL 400R, REGAL 330R, REGAL 660R, MOGUL L (foregoing manufactured by Cabot Corp.), Color Black FW1, Color Black FW285, Color Black FW18, Color Black S170, Color Black S160, HIBLACK 900, HIBLACK 890, Printex 35 and Printex U (foregoing manufactured by Degussa Inc.).

Also examples of yellow pigment include C.I. Pigment Yellow 1, 2, 3, 13, 16, 74, 83, 110 and 128.

Also examples of magenta pigment include C.I. Pigment Red 5, 7, 12, 48(Ca), 48(Mn), 57(Ca), 112, 122, 166 and 206.

Also examples of cyan pigment include C.I. Pigment Blue 1, 2, 3, 15:3, 15:4, 15:6, 16, 22, 25, 60 and 66, C.I. Vat Blue 4 and 6.

Also examples of other pigment include C.I. Pigment Orange 5, 13, 16, 22 and 36, C.I. Pigment Brown 25, C.I. Pigment Green 7, 8 and 36, C.I. Pigment Violet 19, 29 and 37. The present invention is naturally not limited to these examples, and a newly produced pigment may naturally be used.

The pigment ink for ink jet recording of the present invention contains water and a water-soluble organic solvent. The water is preferably not ordinary water containing various ions but ion-exchanged water (deionized water). Examples of the water-soluble organic solvent, to be used in a mixture with water, include alkyl alcohols having 1 to 4 carbon atoms such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or keto alcohols such as acetone and diacetone alcohol; ethers such as tetrahydrofuran and dioxane; polyalkylene glycols such as polyethylene glycol and polypropylene glycol; alkylene glycols the alkylene group of which has 2 to 6 carbon atoms, such as ethylene glycol, propylene glycol, butylene glycol, triethylene glycol, 1,2,6-hexanetriol, thiodiglycol, hexylene glycol and diethylene glycol; glycerin; lower alkyl ethers of polyhydric alcohols such as ethylene glycol monomethyl (or ethyl) ether, diethylene glycol methyl (or ethyl) ether, and triethylene glycol monomethyl (or ethyl) ether; N-methyl-2-pyrrolidone, 2-pyrrolidone and 1,3-dimethyl-2-imidazolidinone. Among these water-soluble organic solvents, preferable are a polyhydric alcohol such as diethylene glycol, and a lower alkyl ether of polyhydric alcohol such as triethylene glycol monomethyl (or ethyl) ether.

The water-soluble organic solvent is used, in the pigment ink, with a content generally within a range of from 3 to 50% by mass, preferably within a range of from 3 to 40% by mass, with respect to the total mass of the pigment ink. Also the content of the used water is within a range of from 10 to 90% by mass, preferably from 30 to 80% by mass, with respect to the total mass of the pigment ink.

Also in the pigment ink for ink jet recording of the present invention, it is preferable that the entire pigment ink is regulated to a neutral or alkaline state. Such state induces an electrostatic repulsion acting between the pigment particles, thereby improving the dispersion stability and obtaining a pigment ink further excellent in the long-term storage property. In such case, however, the pH is preferably maintained within a range of from 7 to 10, since otherwise a corrosion may occur in various components used in an ink jet recording apparatus.

In the pigment ink of the present invention, in addition to the above-described components, a surfactant, a defoamer, an antiseptic and the like may be suitably added in order to obtain a pigment ink having desired physical properties. In particular, the surfactant functioning as a penetration promoter is to be added in an appropriate amount, in order to perform a function of causing the liquid components of the pigment ink to penetrate promptly in the recording medium. An amount of addition thereof is preferably for example from 0.05 to 10% by mass, more preferably from 0.5 to 5% by mass.

In the following, described is a method of producing the pigment ink of the present invention, having the above-described construction. At first, the pigment is added to the water-soluble organic solvent mixed at least with the dispersant polymer and water. Then, after mixing under agitation, a dispersion is executed with dispersion means to be described later and a classification process such as a centrifuging for eliminating coarse particles is executed if necessary, thereby obtaining a desired pigment dispersion liquid. Subsequently, a sizing agent and suitably selected additives as described above are added to the pigment dispersion liquid and agitated to obtain a pigment ink to be used in the present invention.

In the case that the dispersant polymer does not dissolve completely in the alkaline aqueous solution, a base may be added in order to increase the affinity to the dispersion medium. Examples of such base in this case include organic amines such as monoethanolamine, diethanolamine, triethanolamine, aminomethylpropanol and ammonia, and inorganic bases such as potassium hydroxide and sodium hydroxide.

Also in order to dissolve the dispersant polymer in the dispersion medium, a water-soluble organic solvent capable of dissolving the dispersant polymer may be added to the dispersion medium. The water-soluble organic solvent usable in such case may be any one capable of dissolving the dispersant polymer. Examples of advantageously usable ones include lower alcohols such as methanol, ethanol, 1-propanol and 2-propanol; glycols such as diethylene glycol and dipropylene glycol; glycol ethers such as ethylene glycol monomethyl ether, ethylene glycol monoethyl ether, diethylene glycol monomethyl ether, diethylene glycol monoethyl ether, propylene glycol monomethyl ether, propylene glycol monoethyl ether, dipropylene glycol monomethyl ether and dipropylene glycol monoethyl ether; ketones such as methyl ethyl ketone; and cyclic ethers such as tetrahydrofuran. Such water-soluble organic solvent may be mixed with a solvent including for example ion-exchanged water and then used for dissolving the dispersant polymer, or the dispersant polymer may be in advance dissolved in the water-soluble organic solvent and then mixed with the solvent including ion-exchanged water and the like. Also in the preparation of the pigment ink, it is effective to execute a premixing for 30 minutes or longer by agitating the water-soluble organic solvent, containing the pigment, prior to the dispersion process. Such premixing operation is advantageous in improving the wetting property of the pigment surface and promoting the adsorption of the dispersant on the pigment surface.

The disperser to be used in the aforementioned dispersion process for the pigment may be any one of the ordinarily used dispersers, such as a ball mill, a roll mill, a sand mill and Nanomizer (trade name). Among these, a high-speed sand mill is used advantageously. Examples thereof include Super Mill, Sand Grinder, Beads Mill, Agitator Mill, Glen Mill, Dyno Mill, Pearl Mill and Co-Ball Mill (all trade names).

In an ink jet recording method utilizing a pigment ink, the pigment contained in the ink preferably has an optimum particle size distribution, for example in consideration of a clogging resistance on the ink ejecting nozzles. The usable pigment having a desired particle size distribution can be obtained by following methods, for example by reducing the size of the crushing media of the disperser, increasing the fill rate of the crushing media, extending the process time, executing a classification by a filter or a centrifuge after the crushing, or employing a combination of these methods. The pigment ink for ink jet recording of the present invention may be employed in ordinary ink jet recording processes, but exhibits a particularly evident effect when utilized in an ink jet recording process utilizing thermal energy as the ejection energy.

EXAMPLES

In the following, the present invention will be further clarified by Examples and Comparative Examples, but the present invention is not limited thereto. In the following description, "part" means a part by mass, unless specified otherwise.

In the following examples, the compositional ratio of the monomer represented by the formula (1), having an aromatic ring or the like and the monomer having an anionic functional group, constituting the hydrophobic segment, is called a proportion in hydrophobic part. The proportion in hydrophobic part, which is (monomer having an aromatic ring or the like): (monomer having an anionic functional group), is abbreviated as (a):(b). The proportion is represented in mass.

Example 1

(Synthesis of macromonomer M1)

At first, as the constituent materials of the macromonomer, 10 parts of α-methylstyrene dimer and 40 parts of maleic acid were radical polymerized at 75° C. in 500 parts of propylene glycol monomethyl ether and under a $N_2$ gas flow. After the unreacted substances were eliminated by sedimentation purification, the reaction product was dried under a reduced pressure to obtain a macromonomer M1. The macromonomer M1 had a weight-average molecular weight of 800.

(Synthesis of Graft Copolymer G1)

Azobisisobutyronitrile was used as an initiator, and there were employed 20 parts, in solid, of the above-synthesized macromonomer M1, and, as the constituent materials of the main chain unit, 50 parts of 2-vinylpyridine, 10 parts of methacrylic acid and 20 parts of methyl methacrylate. These materials were subjected to a radical polymerization at 75° C. in 500 parts of propylene glycol monomethyl ether and under a $N_2$ gas flow. After the unreacted substances were eliminated by sedimentation, the reaction product was dried under a reduced pressure to obtain a graft copolymer G1. The obtained graft copolymer G1 had a proportion in hydrophobic part (a):(b) of 5:1, an acid value of 222 mgKOH/g and a weight-average molecular weight of 16,000.

(Preparation of pigment dispersion liquid P1)

| | |
|---|---|
| Dispersant 1 | 15 parts |
| Propylene glycol monomethyl ether | 50 parts |
| Ion-exchanged water | 200 parts |
| Potassium hydroxide | 1 part |

After the dispersant polymer, employed as the dispersant 1 was completely dissolved in the formulation above, 15 parts of carbon black (Nipex 180IQ, manufactured by Degussa) were added, and the mixture was subjected to a premixing for 30 minutes and then subjected to a dispersion process under following conditions. The dispersant 1 used above was a styrene-acrylic acid copolymer (acid value: 200 mgKOH/g, weight-average molecular weight: 10,000):

Disperser: Sand Grinder (manufactured by Igarashi Machinery Co.)

Crushing media: zirconia beads (1 mm in diameter)

Fill rate of crushing media: 75% (vol)

Crushing time: 3 hours

Then the solid portion and the solvent portion were separated by acid-out. To the separated solid portion was added a 1 mass % aqueous solution of KOH so as to obtain a solid concentration of 15% by mass, thereby obtaining a pigment dispersion liquid P1.

(Preparation of Pigment Ink I1)

The following components, including the pigment dispersion liquid P1 obtained above and the graft copolymer G1 synthesized above, were mixed to obtain a pigment ink I1 of the present example:

| | |
|---|---|
| Pigment dispersion liquid P1 | 30 parts |
| Graft copolymer G1 | 2 parts |
| Glycerol | 5 parts |
| Diethylene glycol | 5 parts |
| Isopropyl alcohol | 5 parts |
| Acetylenol EH (manufactured by Kawaken Fine Chemical Co.) | 1 part |
| Ion-exchanged water | 52 parts. |

Example 2

(Preparation of Pigment Dispersion Liquid P2)

A pigment dispersion liquid P2 was prepared in the same manner as the preparation of the pigment dispersion liquid P1 in Example 1, except that the graft copolymer G1 prepared above was used as a dispersant polymer instead of the dispersant 1.

(Preparation of Pigment Ink I2)

The following components, including the pigment dispersion liquid P2 obtained above, were mixed to obtain a pigment ink I2 of the present example:

| | |
|---|---|
| Pigment dispersion liquid P2 | 30 parts |
| Glycerol | 5 parts |
| Diethylene glycol | 5 parts |
| Isopropyl alcohol | 5 parts |
| Acetylenol EH (manufactured by Kawaken Fine Chemical Co.) | 1 part |
| Ion-exchanged water | 54 parts |

Example 3

(Synthesis of Macromonomers M2-M6)

Macromonomers M2-M6 were synthesized in the same manner as the synthesis of the macromonomer M1 in Example 1, except for using acrylic acid instead of maleic acid as the monomer. At that time, the macromonomers M2-M6 were prepared with respectively different molecular weights, as shown in Table 1, by suitably regulating the reaction time. The obtained macromonomer M2 was used in synthesizing a graft copolymer G2, used in the present example. The macromonomers M3-M5 were used in synthesizing graft copolymers G3-G16 to be used in Examples 4-17.

TABLE 1

Molecular weights of macromonomers M2-M6

| | macromonomer | | | | |
|---|---|---|---|---|---|
| | M2 | M3 | M4 | M5 | M6 |
| weight-average molecular weight | 1,700 | 250 | 400 | 1,200 | 2,400 |

(Synthesis of Graft Copolymer G2)

20 parts, in solid content, of the macromonomer M2 obtained above, 65 parts of N-vinylcarbazole, 5 parts of acrylic acid and 10 parts of methyl methacrylate were used in the same method as in the synthesis of graft copolymer G1 in Example 1, to obtain a graft copolymer G2. The obtained graft copolymer G2 had a proportion in hydrophobic part (a):(b) of 12:1, an acid value of 237 mgKOH/g and a weight-average molecular weight of 13,000.

(Preparation of Pigment Dispersion Liquid P3)

A pigment dispersion liquid P3 was prepared in the same manner as the preparation of the pigment dispersion liquid P1 in Example 1, except that the graft copolymer G2 prepared above was used as a dispersant polymer instead of the dispersant 1.

(Preparation of Pigment Ink I3)

A pigment ink I3 of the present example was prepared in the same manner as in the preparation of the pigment ink I2 in Example 2, except that the pigment dispersion liquid P3 prepared above was used instead of the pigment dispersion liquid P2.

Examples 4-8

(Synthesis of Graft Copolymers G3-G7)

Graft copolymers G3-G7 were obtained by the same method as in the synthesis of graft copolymer G1 in Example 1, except for employing the following monomers. As the monomers, the macromonomer M2 prepared above, N-vinylcarbazole (abbreviated as NVC), acrylic acid (abbreviated as AA) and benzyl acrylate (abbreviated as BzA) were employed in the compositions shown in Table 2. The obtained graft copolymers G3-G7 had a proportion in hydrophobic part (a):(b), an acid value and a weight-average molecular weight as indicated in Table 2. As indicated in Table 2, the graft copolymers G3-G7 were respectively different in the proportion in hydrophobic part, namely in the compositional proportion of the monomer having the aromatic functional group and the monomer having the anionic functional group in the hydrophobic segment.

TABLE 2

Monomer composition and characteristics of graft copolymers G3-G7

| | compositional ratio | | | | proportion in hydrophobic part (a):(b) | acid value [mgKOH/g] | weight-average molecular weight |
|---|---|---|---|---|---|---|---|
| | hydrophobic segment part | | | hydrophilic part | | | |
| | NVC | AA | BzA | M2 | | | |
| G3 | 65 | 20 | 5 | 10 | 3:1 | 229 | 13,000 |
| G4 | 65 | 14 | 5 | 16 | 5:1 | 231 | 13,100 |
| G5 | 65 | 8 | 5 | 22 | 9:1 | 230 | 13,000 |
| G6 | 65 | 5 | 5 | 25 | 13:1 | 232 | 13,000 |
| G7 | 65 | 3 | 5 | 27 | 20:1 | 233 | 13,000 |

(Preparation of Pigment Dispersion Liquids P4-P8)

Pigment dispersion liquids P4-P8 were prepared in the same manner as in the preparation of the pigment dispersion liquid P1 in Example 1, except that the graft copolymers G3-G7 prepared above were used as a dispersant polymer instead of the dispersant 1.

(Preparation of Pigment Inks I4-I8)

Pigment inks I4-I8 were prepared in the same manner as in the preparation of the pigment ink I2 in Example 2, except that the pigment dispersion liquids P4-P8 prepared above were used instead of the pigment dispersion liquid P2.

Examples 9-13

(Synthesis of Graft Copolymers G8-G12)

Graft copolymers G8-G12 were obtained by the same method as in the synthesis of graft copolymer G1 in Example 1, except for employing the following synthetic materials. As the constituent materials of the main chain unit, 70 parts of styrene, 5 parts of acrylic acid and 10 parts of n-butyl methacrylate were employed, and, as the constituent materials of the side chain unit, 15 parts of the macromonomers M2-M6, having respectively different molecular weights, were used. The obtained graft copolymers G8-G12 had a proportion in hydrophobic part, an acid value and a weight-average molecular weight as indicated in Table 3, and there were obtained graft copolymers G8-G12 respectively different in the molecular weight of the side chain.

TABLE 3

Monomer composition and characteristics of graft copolymers G8-G12

| | macro-monomer | macro-monomer average molecular weight | proportion in hydrophobic part (a):(b) | acid value [mgKOH/g] | weight-average molecular weight |
|---|---|---|---|---|---|
| G8 | M3 | 250 | 13:1 | 162 | 9,000 |
| G9 | M4 | 400 | 13:1 | 160 | 9,600 |
| G10 | M5 | 1,200 | 13:1 | 162 | 10,000 |
| G11 | M2 | 1,700 | 13:1 | 159 | 11,000 |
| G12 | M6 | 2,400 | 13:1 | 160 | 11,000 |

(Preparation of Pigment Dispersion Liquids P9-P13)

Pigment dispersion liquids P9-P13 were prepared in the same method as in the preparation of the pigment dispersion liquid P1 in Example 1, except that the graft copolymers G8-G12 prepared above were used as a dispersant polymer instead of the dispersant 1.

(Preparation of Pigment Inks I9-I13)

Pigment inks I9-I13 were prepared in the same method as in the preparation of the pigment ink I2 in Example 2, except that the pigment dispersion liquids P9-P13 prepared above were used instead of the pigment dispersion liquid P2.

Examples 14-17

(Synthesis of Graft Copolymers G13-G16)

Graft copolymers G13-G16 were obtained by the same method as in the synthesis of graft copolymer G1 in Example 1, except for employing the following monomers in the compositions shown in Table 4. As the monomers, the macromonomer M5, styrene (abbreviated as Sty), acrylic acid (abbreviated as AA) and n-butyl methacrylate (abbreviated as BMA) were employed in the compositions shown in Table 4. The obtained graft copolymers G13-G16 had a proportion in hydrophobic part, an acid value and a weight-average molecular weight as indicated in Table 4. As indicated in Table 4, the graft copolymers G13-G16 were respectively different in the proportion in the acid value.

TABLE 4

Monomer composition and characteristics of graft copolymers G13-G16

| | compositional ratio | | | | proportion in hydrophobic part (a):(b) | acid value [mgKOH/g] | weight-average molecular weight |
|---|---|---|---|---|---|---|---|
| | hydrophobic segment part | | | hydrophilic part | | | |
| | Sty | AA | BMA | M5 | | | |
| G13 | 44 | 3 | 50 | 3 | 15:1 | 44 | 13,200 |
| G14 | 65 | 5 | 25 | 5 | 13:1 | 79 | 13,000 |
| G15 | 65 | 5 | 10 | 20 | 13:1 | 196 | 13,000 |
| G16 | 60 | 5 | 10 | 25 | 11:1 | 238 | 13,100 |

(Preparation of Pigment Dispersion Liquids P14-P17)

Pigment dispersion liquids P14-P17 were prepared in the same method as in the preparation of the pigment dispersion liquid P1 in Example 1, except that the graft copolymers G13-G16 prepared above were used as a dispersant polymer instead of the dispersant 1.

(Preparation of Pigment Inks I14-I17)

Pigment inks I14-I17 were prepared in the same method as in the preparation of the pigment ink I2 in Example 2, except that the pigment dispersion liquids P14-P17 prepared above were used instead of the pigment dispersion liquid P2.

Comparative Example 1

(Synthesis of Random Copolymer R1)

Azobisisobutyronitrile was used as an initiator, and 65 parts of styrene, 25 parts of acrylic acid and 10 parts of n-hexyl acrylate were subjected to a radical polymerization at 75° C. in 500 parts of propylene glycol monomethyl ether and under a $N_2$ gas flow. After the unreacted substances were eliminated by sedimentation, the reaction product was dried under a reduced pressure to obtain a random copolymer R1. The obtained random copolymer R1 had an acid value of 168 mgKOH/g and a weight-average molecular weight of 14,000.

(Preparation of Pigment Ink I18)

The components of the following compositions, utilizing the pigment dispersion liquid P1 obtained in Example 1 and including the random copolymer R1 obtained above, were mixed to obtain a pigment ink I18 of the present comparative example:

| Pigment dispersion liquid P1 | 30 parts |
|---|---|
| Random copolymer R1 | 2 parts |
| Glycerol | 5 parts |
| Diethylene glycol | 5 parts |
| Isopropyl alcohol | 5 parts |
| Acetylenol EH (manufactured by Kawaken Fine Chemical Co.) | 1 part |
| Ion-exchanged water | 52 parts |

Comparative Example 2

(Synthesis of Random Copolymer R2)

Azobisisobutyronitrile was used as an initiator, and 65 parts of styrene, 30 parts of n-butyl acrylate and 5 parts of acrylic acid were subjected to a radical polymerization at 75° C. in 500 parts of propylene glycol monomethyl ether and under a $N_2$ gas flow. After the unreacted substances were eliminated by sedimentation, the reaction product was dried under a reduced pressure to obtain a random copolymer R2. The obtained random copolymer R2 had an acid value of 31 mgKOH/g and a weight-average molecular weight of 25,000. The polymer was scarcely soluble in water and assumed an emulsion state.

(Preparation of Pigment Dispersion Liquid P19)

A pigment dispersion liquid P19 was prepared in the same method as in the preparation of the pigment dispersion liquid P1 in Example 1, except that the random copolymer R2 prepared above was used instead of the dispersant 1.

(Preparation of Pigment Ink I19)

A pigment ink I19 of the present comparative example was prepared in the same manner as in the preparation of the pigment ink I2 in Example 2, except that the pigment dispersion liquid P19 prepared above was used instead of the pigment dispersion liquid P2.

[Evaluation]

The ink characteristics were evaluated by following tests with the pigment inks of Examples and Comparative Examples respectively prepared as described above.

<Evaluation of Storage Stability>

The storage stability of the ink was evaluated by placing 50 ml of each of the prepared pigment inks in a polyethylene container of an internal volume of 100 ml, and measuring the particle diameter and the viscosity before and after a storage at 60° C. for 3 months. A change rate calculated for each case was evaluated by the following criteria and the result of evaluation is indicated in Table 5:

(Criteria of Evaluation)

++ Change rate less than 5%;

+ Change rate equal to or larger than 5% but less than 10%;

− Change rate equal to or larger than 10%.

<Evaluation of Ejection Stability>

The ejection stability of the ink was evaluated in the following manner. Each ink was filled in an ink jet cartridge, and was used in an image formation by a head, mounted in an ink jet printer PIXUS 850i (manufactured by Canon Inc.), in a plain paper standard mode, which is a high-speed print mode. The image formation was conducted continuously on 1,000 sheets of ink jet recording plain paper LC-301 (manufactured by Canon Inc.). The optical densities were measured with a reflective densitometer RD-19I (manufactured by Gretag-Macbeth) on the 1st print and the 1,000th print, to obtain an optical density $OD_1$ for the 1st sheet and an optical density $OD_2$ for the 1,000th sheet. The obtained values $OD_1$ and $OD_2$ were used to calculate a ratio $R_{OD}$ thereof according to the formula $R_{OD}=OD_2/OD_1$. The ejection stability of the ink was evaluated by the obtained value $R_{OD}$ according to the following criteria. The ejection stability of ink is considered better as the value $R_{OD}$ is closer to unity (1). The results of evaluation are indicated in Table 5.

(Criteria of Evaluation)

++ $R_{OD}>0.9$;

+ $0.6<R_{OD}\leq 0.9$;

− $R_{OD}\leq 0.6$.

<Evaluation of Scratch Resistance of Image>

The scratch resistance of the formed image was evaluated by forming an image with each pigment ink of Examples and Comparative Examples in the following manner, and utilizing the obtained image as an evaluation sample, in the following manner. Each ink was filled in an ink jet cartridge, and was used in an image formation by a head, mounted in an ink jet printer PIXUS 950i (manufactured by Canon Inc.). A solid pattern was printed on a commercial glossy paper, Professional Photo Paper PR101 (size L) (manufactured by Canon Inc.), and used as an evaluation sample. A Scotch Tape was adhered on the printed portion of the obtained evaluation sample, then a weight of 500 g was placed thereon for 30 seconds, and then the Scotch Tape was peeled off. The optical density of the printed portion was measured with a reflective densitometer RD-19I (manufactured by Gretag-Macbeth) before and after the adhesion of Scotch Tape, and a colorant residual rate was calculated from the obtained values, according to the following formula. The obtained results are indicated in Table 5

$$\text{colorant residual rate (\%)} = \frac{\text{optical density after scratch resistance test}}{\text{optical density before scratch resistance test}} \times 100$$

(Criteria of evaluation)

++ Colorant residual rate equal to or larger than 80%

+ Colorant residual rate equal to or larger than 70% but less than 80%

± Colorant residual rate equal to or larger than 60% but less than 70%

− Colorant residual rate less than 60%

TABLE 5

| | | Results of evaluation | | | |
|---|---|---|---|---|---|
| | | storage stability | | | scratch |
| | ink | change in particle diameter | change in viscosity | ejection stability | resistance of image |
| Example 1 | I1 | + | + | ++ | + |
| Example 2 | I2 | + | + | ++ | + |
| Example 3 | I3 | ++ | ++ | ++ | + |
| Example 4 | I4 | ++ | ++ | ++ | ++ |
| Example 5 | I5 | ++ | ++ | ++ | ++ |
| Example 6 | I6 | ++ | ++ | ++ | ++ |
| Example 7 | I7 | ++ | ++ | ++ | ++ |
| Example 8 | I8 | ++ | ++ | ++ | + |

TABLE 5-continued

| | | Results of evaluation | | | |
| | | storage stability | | | scratch |
| | ink | change in particle diameter | change in viscosity | ejection stability | resistance of image |
|---|---|---|---|---|---|
| Example 9 | I9 | + | + | ++ | ++ |
| Example 10 | I10 | ++ | ++ | ++ | ++ |
| Example 11 | I11 | ++ | ++ | ++ | ++ |
| Example 12 | I12 | ++ | ++ | ++ | ++ |
| Example 13 | I13 | + | + | ++ | ++ |
| Example 14 | I14 | + | + | ++ | ++ |
| Example 15 | I15 | ++ | ++ | ++ | ++ |
| Example 16 | I16 | ++ | ++ | ++ | ++ |
| Example 17 | I17 | + | + | ++ | ++ |
| Comp. Ex. 1 | I18 | − | − | − | − |
| Comp. Ex. 2 | I19 | − | − | − | ± |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-331152, filed Dec. 7, 2006, which is hereby incorporated by reference herein in its entirety.

What is claimed is:

1. A pigment ink for ink jet recording comprising a pigment, water, a graft copolymer and a water-soluble organic solvent, wherein the graft copolymer has a hydrophobic segment and a hydrophilic segment, the hydrophobic segment is obtained by copolymerizing a monomer represented by the following formula (1), having an aromatic ring or a derivative thereof and a monomer having an anionic functional group, and the hydrophilic segment is obtained by polymerizing a monomer having an anionic functional group:

(1)

wherein Ar represents an aromatic ring selected from a benzene ring, a condensed benzene ring and a heteroaromatic ring, or a derivative thereof.

2. A pigment ink for ink jet recording according to claim 1, wherein the graft copolymer has a main chain constituted of the hydrophobic segment and a side chain constituted of the hydrophilic segment.

3. A pigment ink for ink jet recording according to claim 1, wherein the graft copolymer is contained as a dispersant for the pigment.

4. A pigment ink for ink jet recording according to claim 1, wherein the monomer having an anionic functional group, constituting the hydrophilic segment, is an acrylic acid monomer.

5. A pigment ink for ink jet recording according to claim 1, wherein the monomer having an anionic functional group, constituting the hydrophobic segment, is an acrylic acid monomer.

6. A pigment ink for ink jet recording according to claim 1, wherein the compositional ratio of the monomer represented by the formula (1), having an aromatic ring or a derivative thereof and constituting the hydrophobic segment and the monomer having an anionic functional group and constituting the hydrophobic segment is within a range of from 4:1 to 16:1 in mass ratio.

7. A pigment ink for ink jet recording according to claim 1, wherein the graft copolymer comprises a side chain having a weight-average molecular weight of from 300 to 2,000.

8. A pigment ink for ink jet recording according to claim 1, wherein the graft copolymer has an acid value of from 60 to 200 mgKOH/g.

* * * * *